US010928336B1

(12) United States Patent
Shemesh (10) Patent No.: US 10,928,336 B1
(45) Date of Patent: Feb. 23, 2021

(54) X-RAY BASED EVALUATION OF A STATUS OF A STRUCTURE OF A SUBSTRATE

(71) Applicant: APPLIED MATERIALS ISRAEL LTD., Rehovot (IL)

(72) Inventor: Dror Shemesh, Hod Hasharon (IL)

(73) Assignee: APPLIED MATERIALS ISRAEL LTD., Rehovot (IL)

( * ) Notice: Subject to any disclaimer, the term of this patent is extended or adjusted under 35 U.S.C. 154(b) by 0 days.

(21) Appl. No.: 16/525,037

(22) Filed: Jul. 29, 2019

(51) Int. Cl.
*G01N 23/22* (2018.01)
*G01N 23/2252* (2018.01)
*G01N 23/2206* (2018.01)

(52) U.S. Cl.
CPC ..... *G01N 23/2252* (2013.01); *G01N 23/2206* (2013.01)

(58) Field of Classification Search
CPC ......... G01N 23/2252; G01N 2223/401; G01N 2223/418; G01N 23/2206; G06T 7/0004; H01J 37/28; H01J 2237/22; H01J 2237/2807; H01J 2237/2817
See application file for complete search history.

(56) References Cited

U.S. PATENT DOCUMENTS

| | | | | |
|---|---|---|---|---|
| 5,357,110 A | * | 10/1994 | Statham | G01N 23/223 250/307 |
| 2004/0126909 A1 | * | 7/2004 | Obara | G06T 7/0004 438/14 |
| 2005/0121612 A1 | * | 6/2005 | Okuda | G06T 7/0004 250/311 |
| 2006/0157649 A1 | * | 7/2006 | Martin | G01N 23/2252 250/310 |
| 2013/0015351 A1 | * | 1/2013 | Kooijman | G01N 23/203 250/307 |
| 2015/0122992 A1 | * | 5/2015 | Owen | G01N 23/225 250/307 |
| 2015/0155131 A1 | * | 6/2015 | Sluijterman | H01J 37/265 250/307 |
| 2015/0270094 A1 | * | 9/2015 | Ikku | G01N 23/2252 250/307 |
| 2016/0116425 A1 | * | 4/2016 | Sinha | G01N 23/2252 250/307 |

OTHER PUBLICATIONS https://en.wikipedia.org/wiki/Energy-dispersive_X-ray_spectroscopy, retrieved Apr. 22, 2020 (Year: 2020).*

* cited by examiner

*Primary Examiner* — Wyatt A Stoffa
(74) *Attorney, Agent, or Firm* — Kilpatrick Townsend & Stockton LLP (57) ABSTRACT

A method for x-ray based evaluation of a status of a structure of a substrate, the method may include acquiring an electron image of a region of the substrate, the region comprises the structure; acquiring an x-ray image of the structure; and evaluating the status of the structure, wherein the evaluating is based at least on a number of x-ray photons that were emitted from the structure.

14 Claims, 5 Drawing Sheets

X-RAY BASED EVALUATION OF A STATUS OF A STRUCTURE OF A SUBSTRATE

BACKGROUND OF THE INVENTION

It is hard to evaluate structures such as deep holes and deep trenches. Deep may mean having a depth that may exceed a few micron, for example three microns. Secondary electrons and backscattered electrons emitted from the bottom of such structures fail to exit from the structures.

There is a growing need to provide an efficient, fast, and reliable way to evaluate the status of such structures.

BRIEF SUMMARY OF THE INVENTION

Some embodiments of the disclosure pertain to a method for x-ray based evaluation of a status of a structure of a substrate, the method may include acquiring an electron image of a region of the substrate, the region comprises the structure; acquiring an x-ray image of the structure; and evaluating the status of the structure, wherein the evaluating is based at least on a number of x-ray photons that were emitted from the structure.

Some embodiments provided a computer readable medium that is not transitory and stores instructions that once executed by a computerized system causes the computerized system to execute a process that comprises: acquiring an electron image of an region of a substrate, the region comprises a structure; acquiring an x-ray image of the structure; and evaluating a status of the structure, wherein the evaluating is based at least on a number of x-ray photons that were emitted from the structure There may be provided a charged particle system that comprises charged particle optics and a processor, wherein the charge particle optics is configured to (a) acquire an electron image of an region of the substrate, the region comprises the structure; (b) acquire an x-ray image of the structure; and wherein the processor is configured to evaluate the status of the structure, wherein the evaluating is based at least on a number of x-ray photons that were emitted from the structure.

BRIEF DESCRIPTION OF THE DRAWINGS

The subject matter regarded as one or more embodiments of the disclosure is particularly pointed out and distinctly claimed in the concluding portion of the specification. The one or more embodiments of the disclosure, however, both as to organization and method of operation, together with objects, features, and advantages thereof, may best be understood by reference to the following detailed description when read with the accompanying drawings in which:

DETAILED DESCRIPTION OF THE INVENTION

In the following detailed description, numerous specific details are set forth in order to provide a thorough understanding of the one or more embodiments of the disclosure. However, it will be understood by those skilled in the art that the present embodiments may be practiced without these specific details. In other instances, well-known methods, procedures, and components have not been described in detail so as not to obscure the present one or more embodiments of the disclosure.

The subject matter regarded as the one or more embodiments of the disclosure is particularly pointed out and distinctly claimed in the concluding portion of the specification. The one or more embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, dimensions of some of the elements may be exaggerated relative to other elements for clarity. Further, where considered appropriate, reference numerals may be repeated among the figures to indicate corresponding or analogous elements.

Because the illustrated embodiments may for the most part, be implemented using electronic components and circuits known to those skilled in the art, details will not be explained in any greater extent than that considered necessary as illustrated above, for the understanding and appreciation of the underlying concepts of the present embodiments and in order not to obfuscate or distract from the teachings of the present one or more embodiments of the disclosure.

Any reference in the specification to a method should be applied mutatis mutandis to a system capable of executing the method, and should be applied mutatis mutandis to a computer readable medium that is non-transitory and stores instructions for executing the method. Any reference in the specification to a system should be applied mutatis mutandis to a method that may be executed by the system and should be applied mutatis mutandis to a computer readable medium that is non-transitory and stores instructions executable by the system. Any reference in the specification to a computer readable medium that is non-transitory should be applied mutatis mutandis to a method that may be applied when executing instructions stored in the computer readable medium and should be applied mutatis mutandis to a system configured to execute the instructions stored in the computer readable medium. The term "and/or" means additionally or alternatively.

There may be provided a system, a method and a computer readable medium for evaluating structures such as deep holes and deep trenches.

Figure 1:
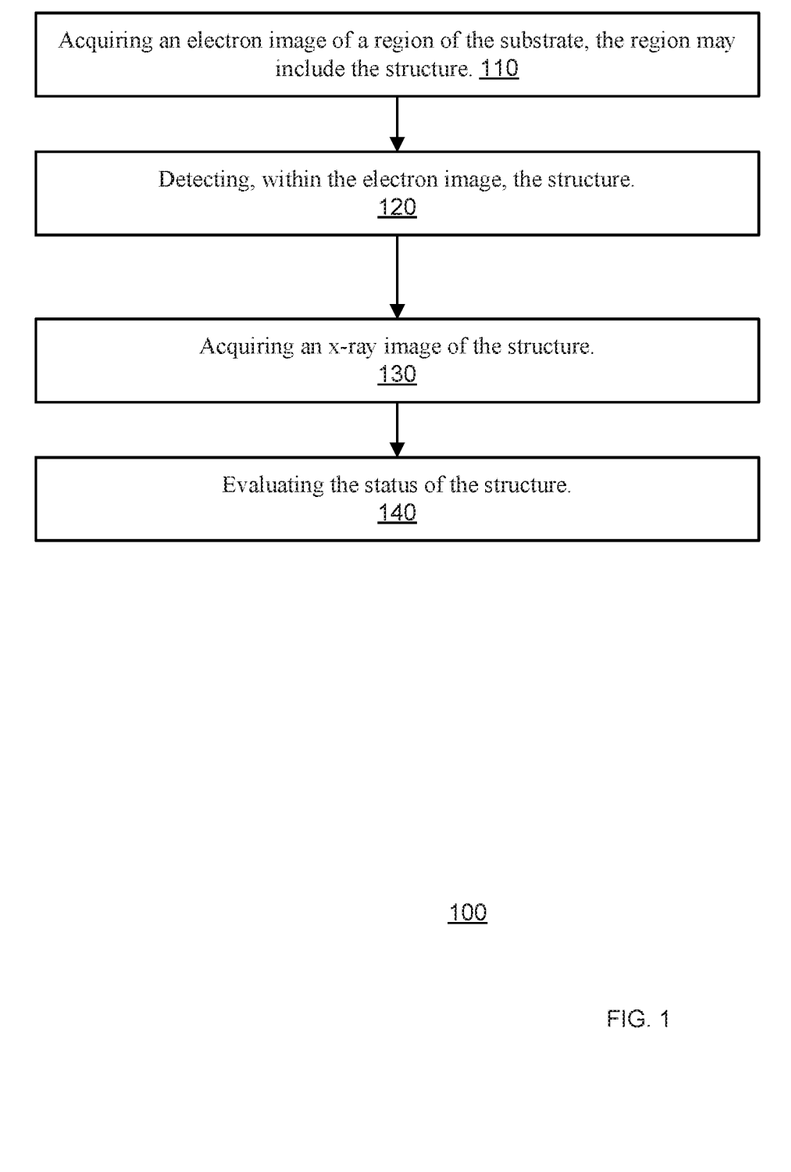
FIG. 1 illustrates an example of a method.

FIG. 1 illustrates an example of a method 100.

Method 100 may start by step 110 of acquiring an electron image of a region of the substrate, the region may include the structure. The region may include multiple structures.

The area of the region may exceed the area of a cross section of the structure by a factor that may exceed ten, twenty, thirty, forty, fifty, one hundred, two hundred, five hundred, one thousand, and the like. The region may be a part of a substrate and may have millimetric dimensions, sub-millimetric dimensions, centimetric dimensions and the like. The region may have any shape.

The region may be selected by a user or an operator of a charged particle beam system, may be selected according to one or more predefined rules, may be determined based on a previous step of inspection, may be selected in a random manner, may be selected in a pseudo-random manner, may be selected based on information about the substrate, and the like. The information about the substrate may be an outcome of an inspection of the region, locations of regions of interest, history of previous failures, and the like.

Step 110 may include illuminating the region with charged particles and detecting electrons emitted from the region as a result of the illuminating. The detected electrons may include secondary electrons, backscattered electrons or both secondary electrons and backscattered electrons. The region may be illuminated with one or more charged particle beams. The illuminating may include scanning the region by any scan pattern.

When the structure is illuminated by charged particles, electrons (such as secondary electrons and/or backscattered electrons) emitted from the bottom of the structure usually do not exit the structure. Accordingly, the structure appears to be black in the electron image of the region.

Step 110 may be followed by step 120 of detecting, within the electron image, the structure. Secondary electrons and backscattered electrons emitted from the bottom of such structures fail to exit from the structure. Accordingly, the structure may be represented in the electron image as a dark portion. Pixels of the electron image that represent the structure may be of a gray level that exceeds a predefined gray level threshold.

Step 120 may be followed by step 130 of acquiring an x-ray image of the structure.

Step 130 may include acquiring an x-ray image of a sub-region that may exceed the structure but is smaller (and even much smaller) than the region.

The sub-region may or may not fit the field of view of a charged particle optics that is configured to acquire the x-ray image of the sub-region. For example—if the field of view of the charged particle optics is rectangular, and the structure has a circular cross section—then the sub-region may have a rectangular shape that includes the structure.

The yield of x-ray photons is a fraction (for example between 0.001 to 0.0001) of the yield of the secondary electrons. Accordingly, a rate of acquisition of an x-ray image is much lower (for example by a factor of at least one hundred) than a rate of acquisition of an electron image. A rate of an acquisition is a time required to acquire an image per an area unit. The electron image may exhibit a higher signal to noise ratio than the x-ray image.

Due to the difference in the acquisition rates it may be beneficial to select a sub-region that is much smaller than the region. The sub-region may be selected to slightly exceed the area of the structure. For example, when the structure has a diameter of about seventy nanometers the sub-region may be a square of one hundred nanometers by one hundred nanometers.

The acquisition of an x-ray image of a sub-region (instead of acquiring an x-ray image of the entire region) speeds up the execution of method 100 and increases the throughput of the evaluation process.

Step 130 may include illuminating the sub-region with charged particles and detecting x-ray photons emitted from the region as a result of the illuminating.

Step 110 may be regarded as a first phase of an illumination process while step 130 may be regarded as a second phase of the illumination process.

Step 130 may be followed by step 140 of evaluating the status of the structure. The evaluating may be based at least on a number of x-ray photons that were emitted from the structure. The phrase "based at least" means that the evaluation may be also based on additional information. The number of the x-ray photons that were emitted from the structure may be equal to a number (sum) of x-ray photons detected from each pixel related to the structure.

The x-ray image may be relatively noisy, have a low signal value (few x-ray photons per pixel) and may exhibit a low signal to noise ratio per pixel. The number of x-ray photons that were emitted from the (entire) structure is much larger, is more robust to noise (as the number takes into account x-ray photons from different pixels), and exhibits a signal to noise ratio that exceeds the signal to noise ratio of single pixels of the x-ray image. Furthermore, representing the structure by the number of x-ray photons that were emitted from the structure (instead of representing each single pixel) requires less storage elements, facilitates a simpler processing of the x-ray image and requires less computational resources in comparison to a defect classification that involves pixel based comparison of images of structures.

Step 140 may include at least one of the following:
  a. Calculating a signature of the structure. The signature may represent the number of x-ray photons emitted from the structure. The signature may include one or more numbers of x-ray photons emitted from the structure that have energies within one of more energy ranges. Different energy ranges may or may not represents different materials.
  b. Determining the status of the structure based, at least in part, on the signature.
  c. Comparing the signature of the structure to signatures of other structures.
  d. Comparing the signature of the structure to signatures of one or more reference structures.
  e. Comparing the signature of the structure to a reference signature. The reference signature may be a signature of one or more other structures, may represents statistics regarding signatures of other references signatures (for example average and standard deviation of multiple signatures), and the like.
  f. Applying one or more evaluation rules on the signature—for example—determining a value range that includes the signature of the structure, determining relationships between different numbers of x-ray photons from different energy ranges, and the like.
  g. Detecting a defect in the structure.
  h. Classifying a defect of the structure.
  i. Classifying a defect of the structure based on the signature of the structure. The classification may include searching for a class of defects that fits or is otherwise related to the signature of the structure. The classification may include finding the best matching class or applying any other criterion.
  j. Evaluating the status of the structure based on at least a first number of x-ray photons that were emitted from the structure and have an energy within a first energy range.
  k. Evaluating of the status of the structure based on at least, (a) a first number of x-ray photons that were emitted from the structure, and have an energy within a first energy range, and (b) a second number of x-ray photons that were emitted from the structure, and have an energy within a second energy range, wherein the second energy range differs from the first energy range.
  l. Comparing the number of the x-ray photons that were emitted from the structure and one or more reference numbers of x-ray photons.

Few examples of one or more evaluation rules are provided below:
  a. Determining that the structure is defective when the number of x-ray photons emitted from the structure is within (or without) a certain range, or is outside a certain range, or is below a threshold, or is above a threshold, and the like.

b. Assuming a certain population of structures that exhibits an average number of emitted x-ray photons and a standard deviation of emitted x-ray photons. The evaluation rules, once applied, may result in determining that the structure is defective if the number of x-ray photons emitted from the structure deviates from the average number by more than the standard deviation.

c. Assuming a certain population of structures that exhibits an average number of emitted x-ray photons and a standard deviation of emitted x-ray photons. The evaluation rules, once applied, may result in determining that the structure is defective if the number of x-ray photons emitted from the structure deviates from an average number by more than a product of a multiplication between a certain factor and the standard deviation.

d. Determining that the structure is defective if the number of x-ray photons (within or without a certain energy range) emitted from the structure is within (or without) a certain range, or is below a threshold, or is above a threshold, and the like.

e. Determining that the structure is defective if a first number of x-ray photons (within or without a first energy range) emitted from the structure is within (or without) a first certain range and/or a second number of x-ray photons (within or without a second energy range) emitted from the structure is within (or without) a second certain range.

f. Classifying a defective structure element based on a number of x-ray photons emitted from the structure.

g. Classifying a defective structure element based on numbers of x-ray photons that belong to different energy ranges that were emitted from the structure.

h. The classifying may include determining a first class of defects that includes structures that emitted less than a first threshold (for example one hundred) of x-ray photons having an energy within a first energy range that corresponds to emissions from a first material (for example titanium, silicon, tungsten, vanadium, iron, zinc, and the like).

i. The classifying may include determining a second class of defects includes structures that emitted more than a first threshold (for example one hundred) but less than a second threshold (for example—two hundred) of x-ray photons having an energy within the first energy range that corresponds to emissions from the first material.

j. The classifying may include determining a third class of defects includes structures that emitted more than the second threshold (for example—two hundred) of x-ray photons having an energy within the first energy range that corresponds to emissions from the first material.

It should be noted that a defect may be classified based on numbers of x-ray photons emitted in different energy ranges that correspond to different materials.

Step 140 may be applied on a single structure basis or applied on a group of structures basis. A group of structures may include two or more structures. The two or more structures of the group may be consecutive structures (for example an entire grid of structures), or may include at least two structure that are not consecutive structures. The status of a group of structures may be determined by applying any of the steps illustrated in the paragraphs above to a group of structures.

Method 100 may include generating a signature of a group of structures and using the signature of the group of structures to evaluate the group of structures and/or to evaluate a status of one or more structures of the group.

Method 100 may be repeated multiple times in order to acquire images of multiple regions and evaluate the status of one or more structures located in one or more regions of the substrate. The multiple region may cover the entire substrate or may cover only a part of the substrate.

Figure 2:
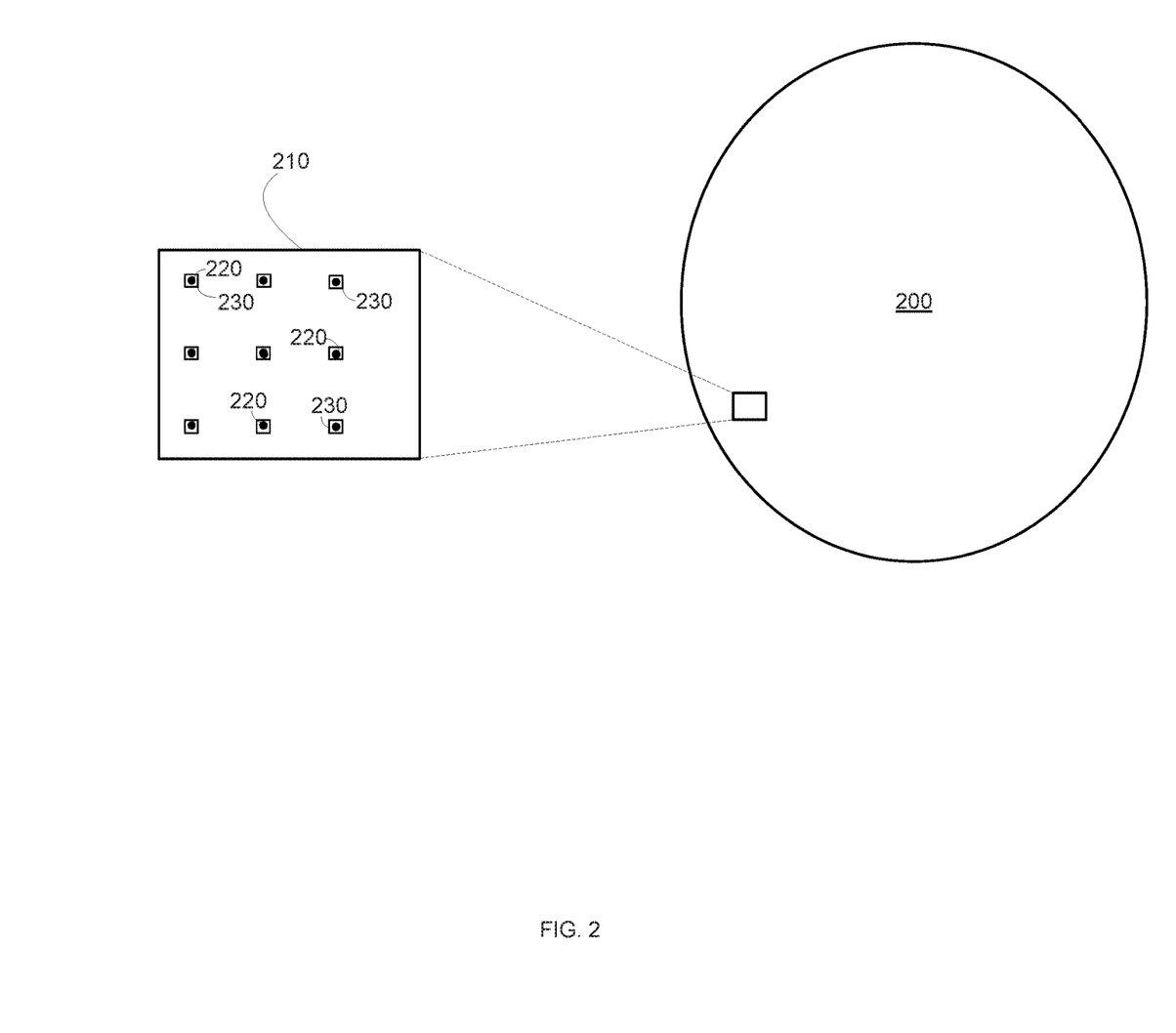
FIG. 2 illustrates an example of a substrate, a region and various structures.

FIG. 2 is an example of a region 210 of a substrate 200. Region 210 includes multiple structures 220 that are deep holes. Sub-regions 230 surround the structures 220.

Figure 3:
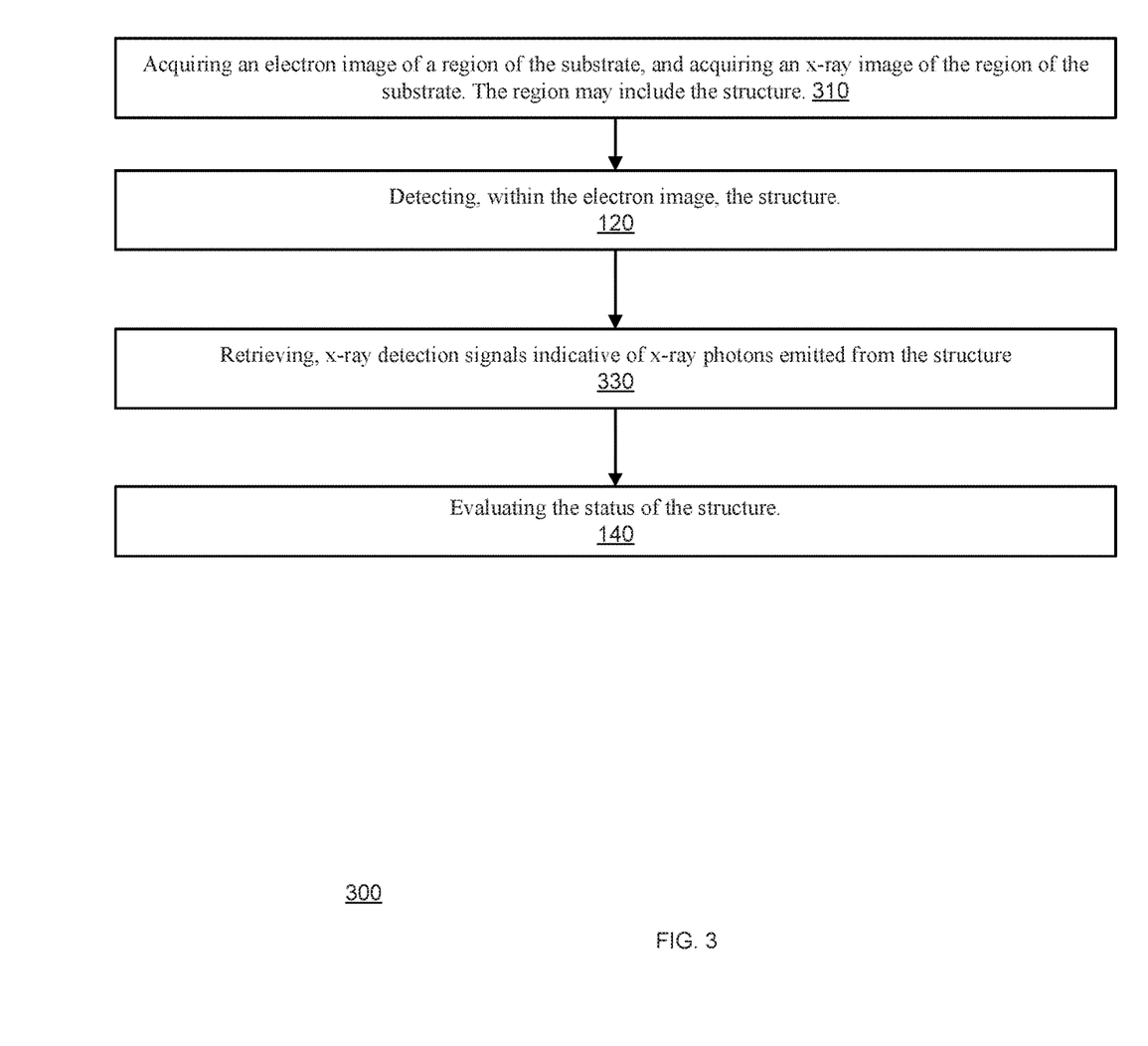
FIG. 3 illustrates an example of a method.

FIG. 3 illustrates an example of a method 300. Method 300 may start by step 310 of (a) acquiring an electron image of a region of the substrate, and (b) acquiring an x-ray image of the region of the substrate. The region may include the structure.

Step 310 may include illuminating the region with charged particles and detecting electrons and x-ray photons emitted from the region. Step 310 may be followed by step 120 of detecting, within the electron image, the structure.

Step 120 may include determining the locations of structure electron image pixels out of the entire electron image pixels. The structure electron image pixels are pixels of the electron image that represent the structure. Step 120 may be followed by step 330 of retrieving, x-ray detection signals indicative of x-ray photons emitted from the structure.

Step 330 includes retrieving, out of the entire x-ray image pixels, x-ray image pixels located at the locations of the structure electron image pixels. Step 330 may be followed by step 140.

Method 300 is slower than method 100, as method 300 involves acquiring an x-ray image of the entire region. Nevertheless, method 300 may be simpler to implement as it does not require multiple illumination scans. Any one of method 100 and 300 may be executed in combination with a defect detection processes.

Figure 4:
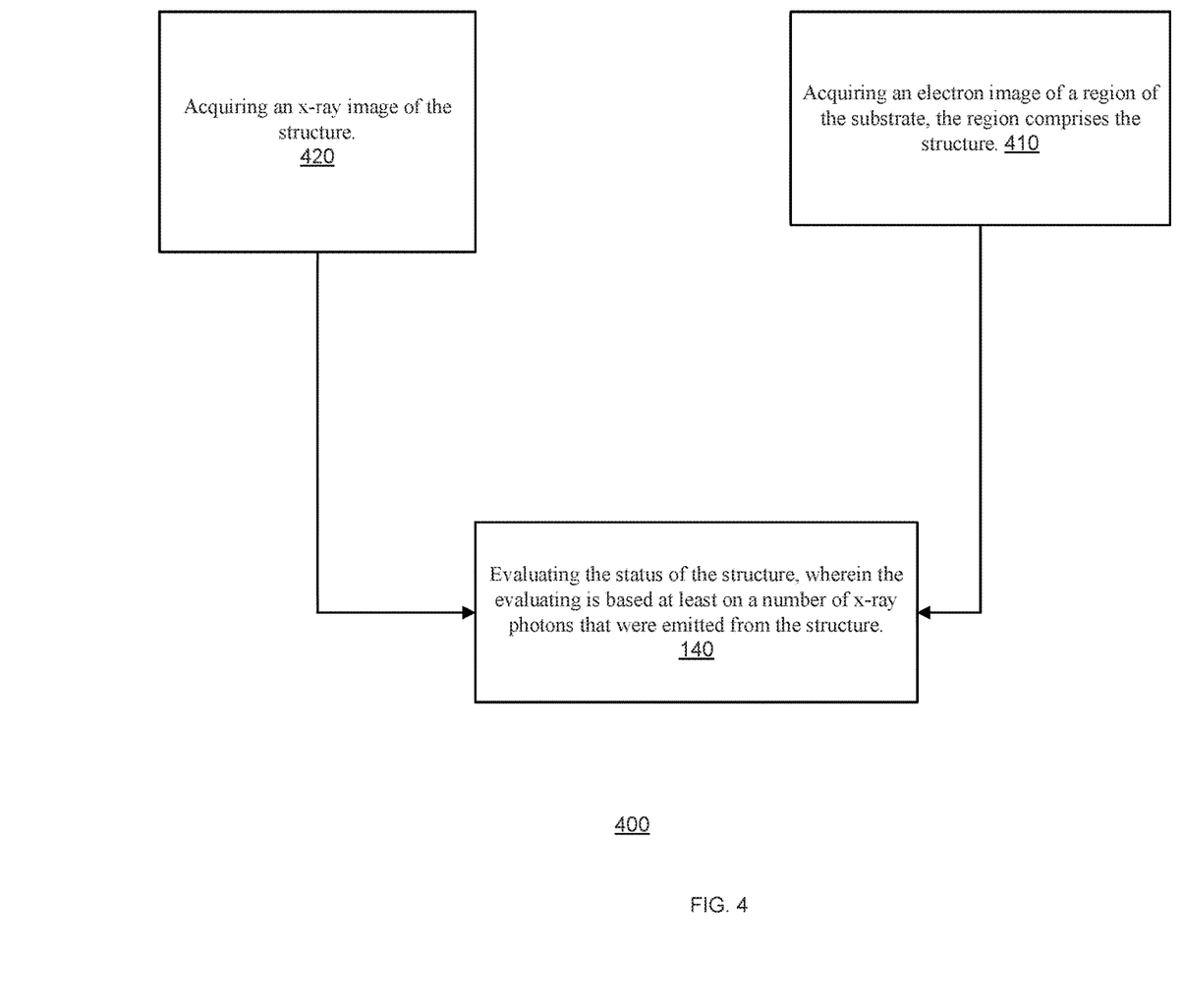
FIG. 4 illustrates an example of a method.

FIG. 4 illustrates an example of method 400. Method 400 may include steps 410, 420, 430 and 140. Step 410 may include acquiring an electron image of a region of the substrate, the region comprises the structure. Step 420 may include acquiring an x-ray image of the structure. Steps 410 and 420 may be followed by step 140 of evaluating the status of the structure, wherein the evaluating is based at least on a number of x-ray photons that were emitted from the structure. The structure may be a hole or a trench that has a depth that exceeds three microns.

Method 400 may include detecting the structure in the electron image. The detecting of the structure in the electron image may be followed by step 420. The detecting of the structure in the electron image may be preceded by generating x-ray detection signals indicative of x-ray photons emitted from the region. The detecting of the structure in the electron image may be followed by retrieving x-ray detection signals indicative of x-ray photons emitted from the structure.

Method 100 and method 300 may be regarded as different examples of method 400.

Figure 5:
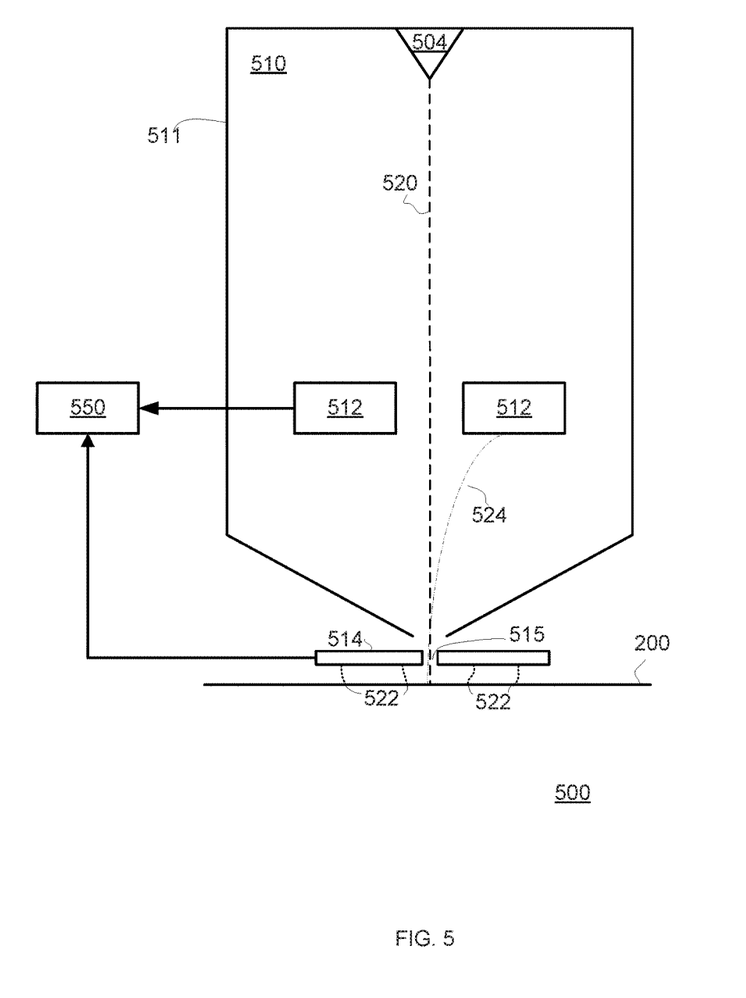
FIG. 5 illustrates an example of a charged particle system.

FIG. 5 illustrates an example of a charged particle system 500. The charged particle system includes charged particle optics 510 and a processor 550. The charged particle optics 510 is configured to (a) acquire an electron image of a region of the substrate, the region may include the structure; and (b) acquire an x-ray image of (at least) the structure.

The charged particle optics 510 may be configured to acquire an x-ray image of the structure, an ex-ray image of a subregion that includes the structure, of even acquire an x-ray image of the entire region.

The processor 550 is configured to evaluate the status of the structure. The evaluating is based at least on a number of x-ray photons that were emitted from the structure.

The charged particle system 500 may be configured to execute at least one method of methods 100, 300 and 400.

In FIG. 5, the charged particle optics 510 includes one or more electron detectors such as a secondary electron detector 512, and also includes an x-ray detector 514 for detecting x-ray photons 522. The x-ray detector 514 is positioned between a column 511 of the charged particle optics 510 and the substrate 200. The secondary electron detector 512 is an in-lens detector that is positioned within the column. It should be noted that (a) the charged particle optics 510 may include one or more backscattered detectors, instead of the secondary electron detector, and that (b) the charged particle optics 510 may include one or more backscattered detectors in addition to the secondary electron detector.

In FIG. 5 the charged particle optics 510 also includes a beam source 504 for outputting a charged particle beam 520.

The x-ray detector 514 has an aperture 515 through which the charged particle beam 520 passes before impinging on the substrate 200. Secondary electrons 524 and backscattered electrons may propagate through the aperture. The aperture 515 may be located at the center of the x-ray detector 514 or outside the center of the x-ray detector 514.

It should be noted that the charged particle system 500 may have other configurations. For example, the charged particle system 500 may include one or more other detectors, may include one or more out-of-lens secondary electron detectors, may include one or more in-lens x-ray detectors, may include multiple x-ray detectors, may include multiple secondary electron detectors, there may be any spatial relationship between the column and any of the detectors, an angle of illumination of the substrate may be non-normal to the substrate, any charged particle beam may be deflected and/or manipulated in manners that are not shown in FIG. 5, and there may be additional optical elements such as condensing lenses or any other optic lens or element.

In the foregoing specification, the one or more embodiments of the disclosure have been described with reference to specific examples of embodiments of the invention. It will, however, be evident that various modifications and changes may be made therein without departing from the broader spirit and scope of the one or more embodiments of the disclosure as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the embodiments described herein are, for example, capable of operation in other orientations than those illustrated or otherwise described herein.

Any reference to the terms "comprising", "having" or "including" may be applied mutatis mutandis to "consisting" or to "consisting essentially of".

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for x-ray based evaluation of a status of a hole or trench formed in a substrate, the method comprising:
    acquiring an electron image of a region of the substrate that includes the hole or trench;
    acquiring an x-ray image comprising a plurality of pixels of the hole or trench;
    summing a number of x-ray photons detected from each pixel related to the hole or trench in the x-ray image; and
    evaluating the status of the hole or trench, wherein the evaluating is based at least on the summed number of x-ray photons that were emitted from the hole or trench; and
    detecting the hole or trench in the electron image;

wherein the detecting of the hole or trench in the electron image is preceded by generating x-ray detection signals indicative of x-ray photons emitted from the region.

2. The method according to claim 1 wherein the hole or trench has a depth that exceeds three microns.

3. The method according to claim 1 wherein the detecting of the hole or trench in the electron image is followed by acquiring the x-ray image of the hole or trench.

4. The method according to claim 1 wherein the detecting of the hole or trench in the electron image is followed by retrieving x-ray detection signals indicative of x-ray photons emitted from the hole or trench.

5. The method according to claim 1 wherein the evaluating of the status of the hole or trench is based on at least a first number of x-ray photons that were emitted from the hole or trench and have an energy within a first energy range.

6. The method according to claim 1 wherein the evaluating of the status of the hole or trench is based on at least, (a) a first number of x-ray photons that were emitted from the structure, and have an energy within a first energy range, and (b) a second number of x-ray photons that were emitted from the hole or trench and have an energy within a second energy range, wherein the second energy range differs from the first energy range.

7. The method according to claim 1 wherein the evaluating of the status of the hole or trench comprising detecting a defect in the hole or trench.

8. The method according to claim 1 wherein the evaluating of the status of the hole or trench comprising classifying a defect in the hole or trench.

9. The method according to claim 1 wherein the evaluating of the status of the hole or trench comprises comparing the number of the x-ray photons that were emitted from the hole or trench and a reference number of x-ray photons.

10. The method according to claim 1 wherein the evaluating of the status of the hole or trench comprises comparing the number of the x-ray photons that were emitted from the hole or trench to one or more numbers of x-ray photons that were emitted from one or more other holes or trenches.

11. The method according to claim 1 comprising evaluating a status of a group of hole or trench that comprise the hole or trench, wherein the evaluating of the status of the group is based, at least in part, on a number of the x-ray photons that were emitted from each hole or trench of the group.

12. The method according to claim 1 further comprising:
    after the electron image of the region is acquired, detecting, within the electron image, the hole or trench; and
    wherein acquiring an x-ray image comprising a plurality of pixels of the hole or trench includes acquiring, after the structure is detected within the electron image, an x-ray image of a sub-region of the region that is much smaller than the region and slightly larger than an area of the hole or trench.

13. The method according to claim 1 wherein acquiring the x-ray image comprising a plurality of pixels of the hole or trench includes acquiring an x-ray image of the entire region captured by the electron image.

14. A computer readable medium that is not transitory and stores instructions that once executed by a computerized system causes the computerized system to execute a process that comprises:
    acquiring an electron image of a region of a substrate, the region comprising a hole or trench;
    acquiring an x-ray image comprising a plurality of pixels of the hole or trench;
    summing a number of x-ray photons detected from each pixel related to the hole or trench in the x-ray image;
    evaluating a status of the hole or trench, wherein the evaluating is based at least on a number of x-ray photons that were emitted from the hole or trench; and
    detecting the hole or trench in the electron image;
    wherein the detecting of the hole or trench in the electron image is preceded by generating x-ray detection signals indicative of x-ray photons emitted from the region.

* * * * *